(12) United States Patent
Nickerson

(10) Patent No.: US 7,949,729 B2
(45) Date of Patent: May 24, 2011

(54) SYSTEM AND METHOD FOR DISPLAYING DYNAMIC PAGE CONTENT IN A PAGE-CACHING BROWSER

(75) Inventor: Thomas W. Nickerson, Jamaica Plain, MA (US)

(73) Assignee: Oracle International Corp., Redwood Shores, CA (US)

( * ) Notice: Subject to any disclaimer, the term of this patent is extended or adjusted under 35 U.S.C. 154(b) by 874 days.

(21) Appl. No.: 11/770,298

(22) Filed: Jun. 28, 2007

(65) Prior Publication Data

US 2008/0177859 A1 Jul. 24, 2008

Related U.S. Application Data

(62) Division of application No. 09/871,444, filed on May 31, 2001, now abandoned.

(51) Int. Cl.
*G06F 15/16* (2006.01)
(52) U.S. Cl. ...................................................... 709/219
(58) Field of Classification Search .................. 709/219, 709/245, 225, 217
See application file for complete search history.

(56) References Cited

U.S. PATENT DOCUMENTS

| 6,536,043 | B1 * | 3/2003 | Guedalia ........................ 725/90 |
| 6,952,737 | B1 * | 10/2005 | Coates et al. .................. 709/229 |
| 7,395,348 | B1 * | 7/2008 | Cieslak et al. ................. 709/238 |
| 7,725,596 | B2 * | 5/2010 | Garcia-Luna-Aceves et al. ............................. 709/238 |
| 2002/0010798 | A1 * | 1/2002 | Ben-Shaul et al. ............ 709/247 |
| 2002/0019853 | A1 * | 2/2002 | Vange et al. ................... 709/207 |

* cited by examiner

*Primary Examiner* — Benjamin R Bruckart

(57) ABSTRACT

Embodiments of the present invention provide a system and method for displaying dynamic page content in a page-caching browser. The system and method prevent the loading of unintended page content from a local cache into a browser by ensuring the uniqueness of the content request. Such embodiments include (i) specifying an address to stored content; (ii) appending a unique identifier to the address; (iii) requesting the content with the address and appended identifier; and (iv) transmitting the content request to the server regardless of whether there is cached content associated with the address. By appending a unique identifier to the requested address, each content request is unique, thus, preventing the browser from locating and loading corresponding content from the cache.

10 Claims, 17 Drawing Sheets

| | ADDRESS REQUESTED | SERVER/CACHE | RESULTING PAGE CONTENT |
|---|---|---|---|
| | NEW SESSION | | |
| R1 | /PAGE1.HTML | HOST SERVER | CAR WITH (1) BLACK EXTERIOR (2) GREY INTERIOR |
| R2 | /PAGE1.HTML?EXT_COLOR="RED" | HOST SERVER | CAR WITH (1) RED EXTERIOR (2) GREY INTERIOR |
| R3 | /PAGE1.HTML?INT_COLOR="BLACK" | HOST SERVER | CAR WITH (1) RED EXTERIOR (2) BLACK INTERIOR |
| | CLOSE SESSION | | |
| | NEW SESSION | | |
| R4 | /PAGE1.HTML | LOCAL CACHE | CAR WITH (1) BLACK EXTERIOR (2) GREY INTERIOR |
| R5 | /PAGE1.HTML?INT_COLOR="BLACK" | LOCAL CACHE | CAR WITH (1) RED EXTERIOR (2) BLACK INTERIOR |

PRIOR ART
FIG. 1B

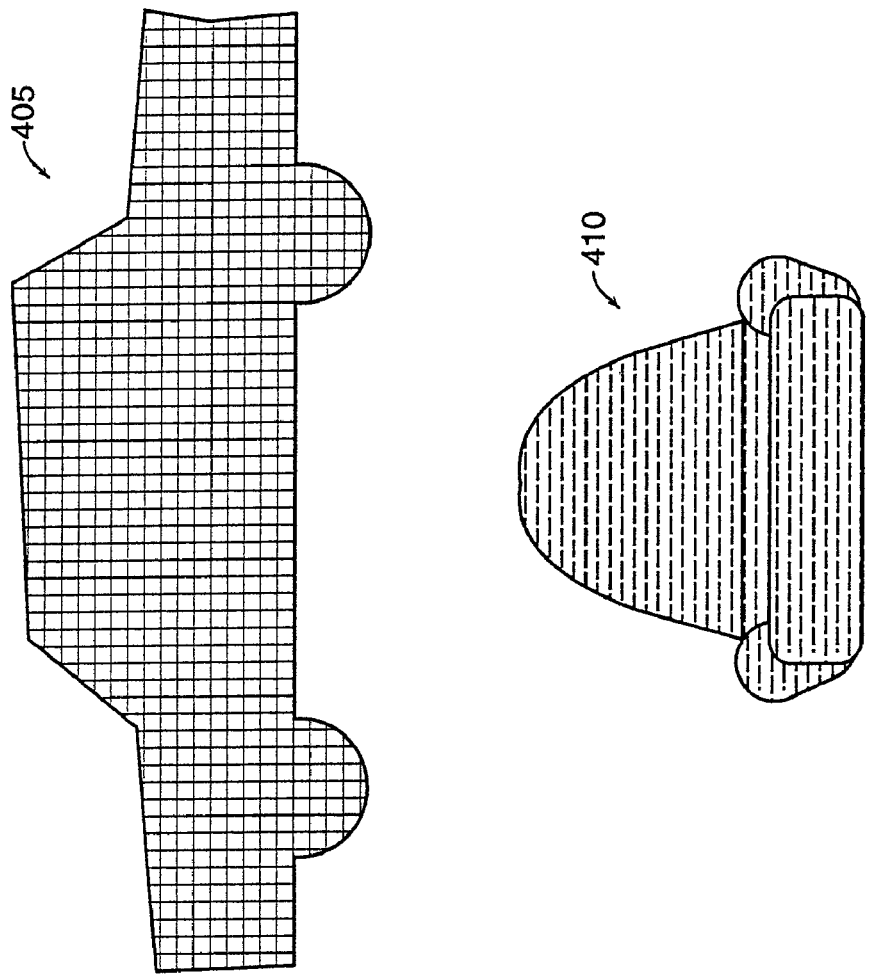
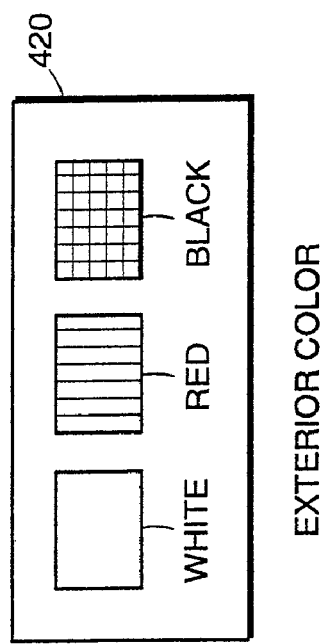
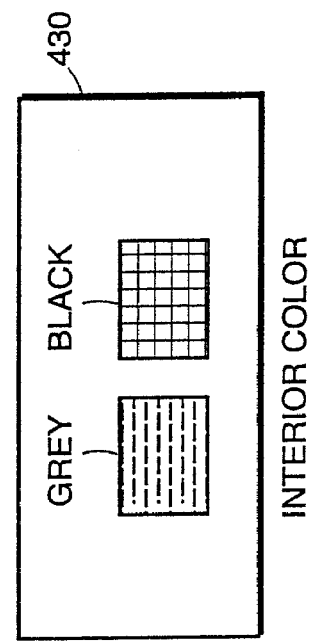
FIG. 1C

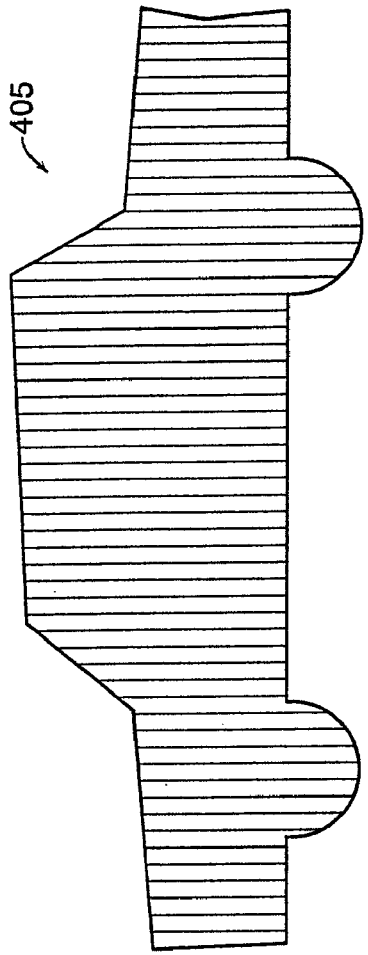
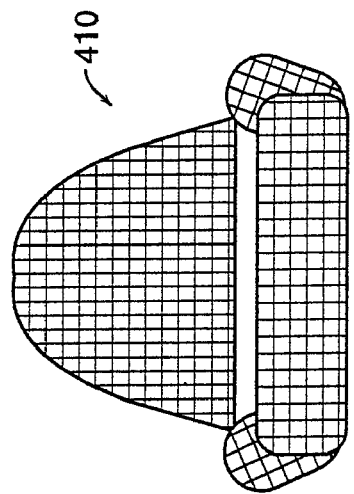
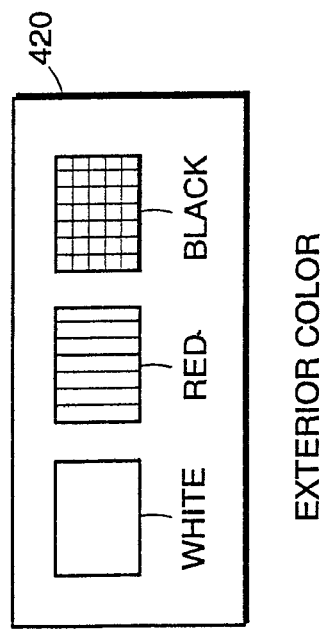
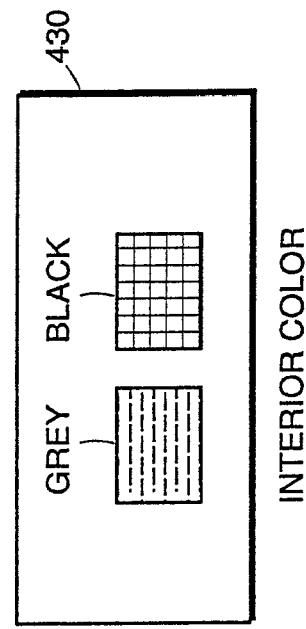
FIG. 1G

|  | ADDRESS REQUESTED | SERVER/CACHE | RESULTING PAGE CONTENT |
|---|---|---|---|
|  | NEW SESSION |  |  |
| R1 | /PAGE1.HTML?&ID=1231123678 | HOST SERVER | CAR WITH<br>(1) BLACK EXTERIOR<br>(2) GREY INTERIOR |
| R2 | /PAGE1.HTML?EXT_COLOR="RED"&ID=19283192873 | HOST SERVER | CAR WITH<br>(1) RED EXTERIOR<br>(2) GREY INTERIOR |
| R3 | /PAGE1.HTML?INT_COLOR="BLACK"&ID=123612 | HOST SERVER | CAR WITH<br>(1) RED EXTERIOR<br>(2) BLACK INTERIOR |
|  | CLOSE SESSION |  |  |
|  | NEW SESSION |  |  |
| R4 | /PAGE1.HTML?&ID=8798456 | HOST SERVER | CAR WITH<br>(1) BLACK EXTERIOR<br>(2) GREY INTERIOR |
| R5 | /PAGE1.HTML?INT_COLOR="BLACK"&ID=458 | HOST SERVER | CAR WITH<br>(1) BLACK EXTERIOR<br>(2) BLACK INTERIOR |

FIG. 2B

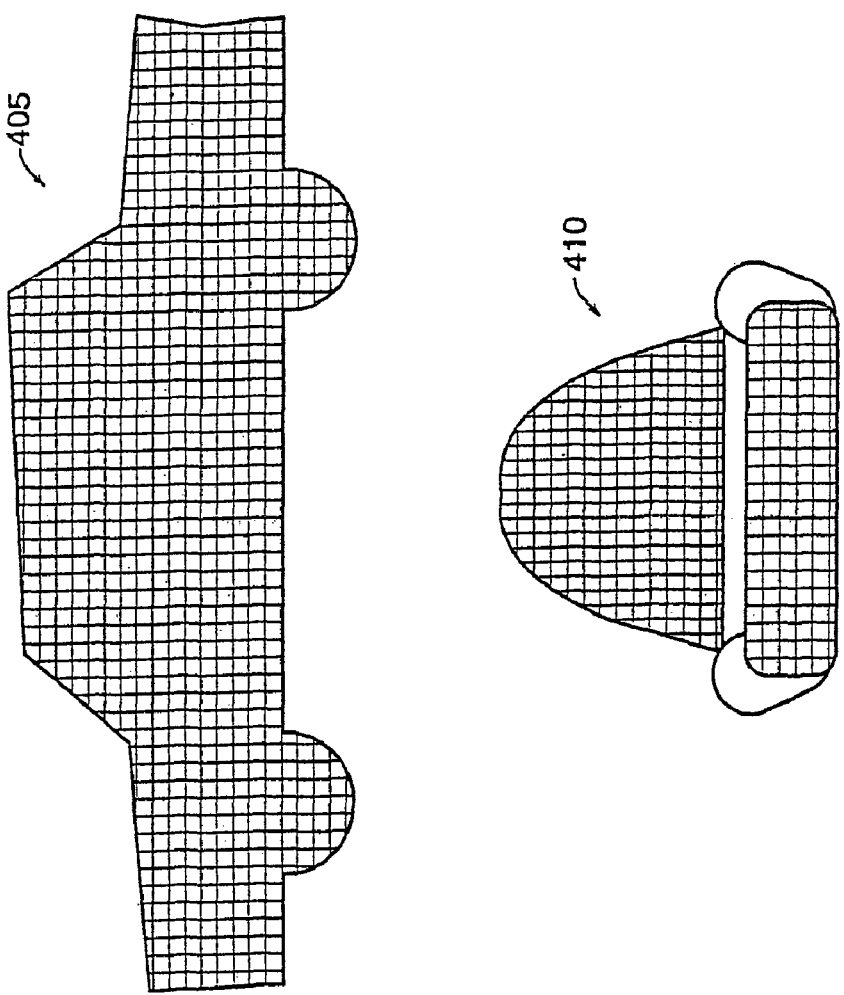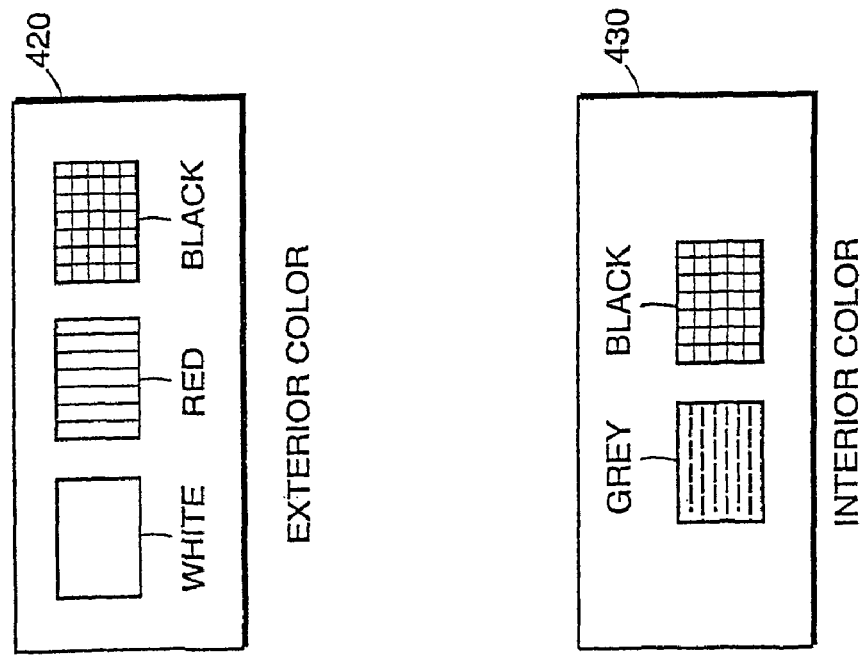
FIG. 2G

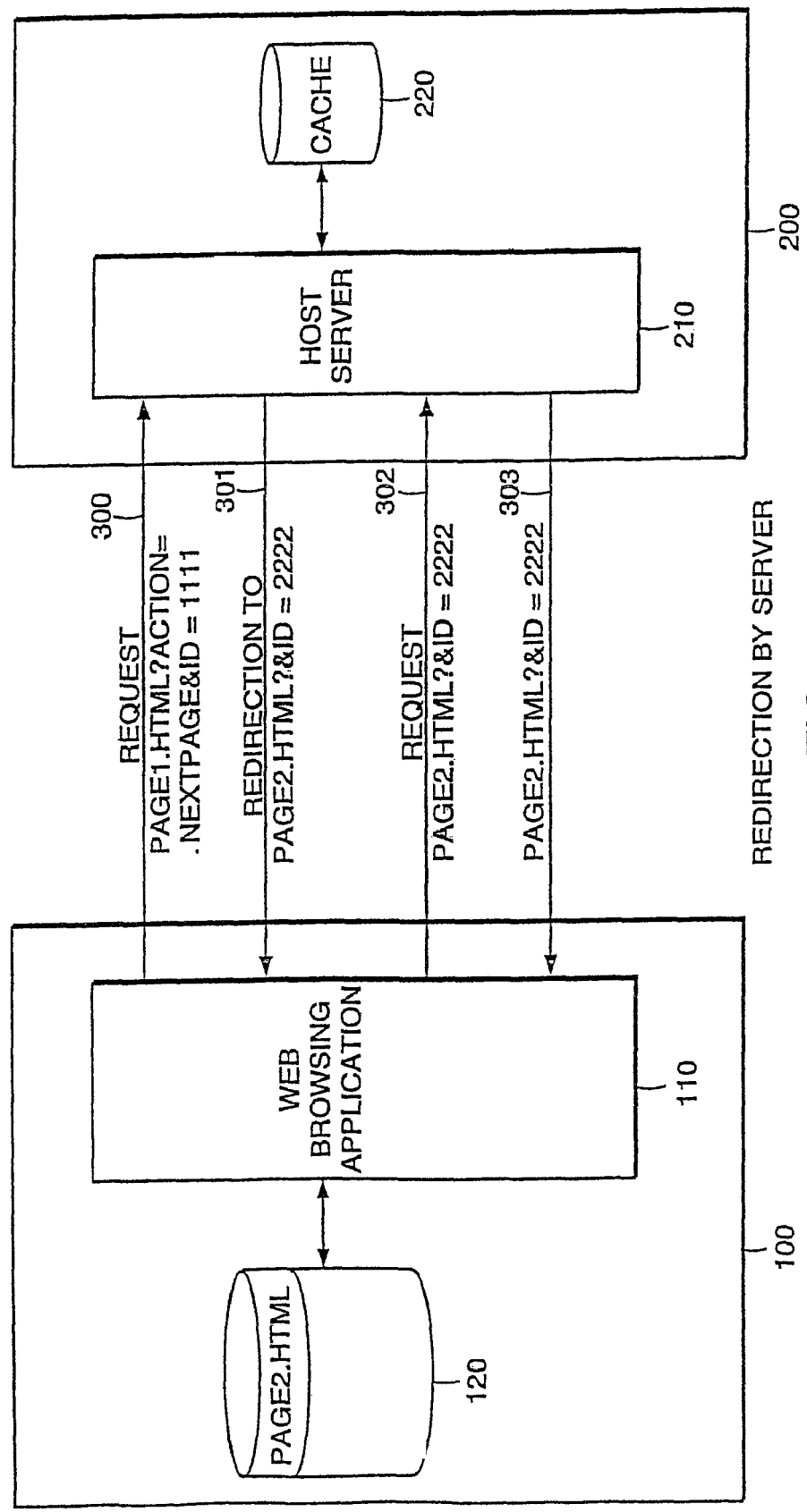

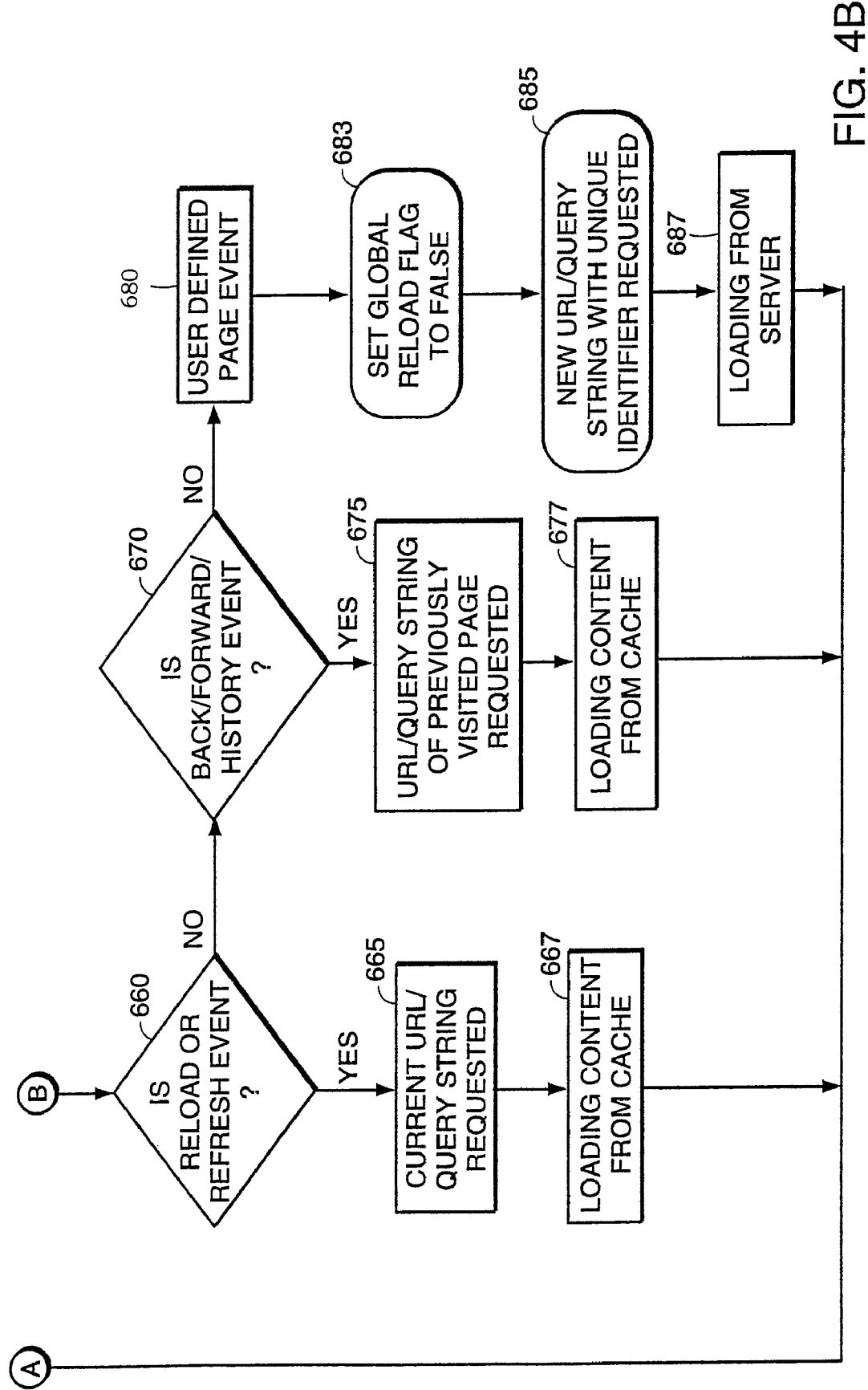

SYSTEM AND METHOD FOR DISPLAYING DYNAMIC PAGE CONTENT IN A PAGE-CACHING BROWSER

CROSS REFERENCE TO RELATED APPLICATIONS

This patent application is a Divisional of U.S. patent application Ser. No. 09/871,444 filed on May 31, 2001, now abandoned entitled, "SYSTEM AND METHOD FOR DISPLAYING DYNAMIC PAGE CONTENT IN A PAGE-CACHING BROWSER", the contents and teachings of which are hereby incorporated by reference in their entirety.

BACKGROUND

Client-side browsing applications, such as web browsers, are tools for viewing multimedia content, such as web pages. A web page is displayed by loading one or more script files that define page content and function into a browser. According to various embodiments, script files maybe encoded in a markup language, such as HTML or XML, and may also include instructions from scripting languages, such as JavaScript. Script files may reference other script files and/or content files, which store formatted graphics, audio and/or video for additional display and sound.

Web pages are typically served upon request by a host server. A web browser requests a web page from the server by specifying an address, such as a URL (Universal Resource Locator), in a content request message, such as an HTTP request message (i.e., HyperText Transport Protocol). A URL is an address identifying the location of a resource, such as a script file or content file. User-specified parameters may be appended to the URL in the form of a query string (i.e., "?<parameter1>=<value1> ... ") providing for customized and/or interactive page content implemented through server-side processing.

Most browsers have the ability to locally cache web pages by caching the constituent script and content files on the client computer's hard drive as they are loaded. Caching improves browser performance such that a web page can be loaded directly from cache memory, avoiding additional network and processing delays.

SUMMARY

Embodiments of the invention include a system and method for displaying dynamic page content in a page-caching browser, which avoids the display of unintended page content in a browser. Such embodiments include (i) specifying an address to stored content; (ii) appending a unique identifier to the address; (iii) requesting the content with the address and the appended identifier; and (iv) transmitting the content request to the server regardless of whether there is cached content associated with the address.

According to various embodiments, the address includes a Universal Resource Locator (URL) to content of at least a portion of a web page and a query string in which a unique identifier is appended to the address.

The unique identifier may be generated in a number of ways known to those skilled in the art. For example, in one embodiment, the unique identifier maybe a random number generated by a script function, such as the Math.random( ) method defined in JavaScript. In another embodiment, the unique identifier may be a system time stamp. In a further embodiment, the unique identifier may include any unique alpha-numeric or other symbolic representation.

Embodiments of the invention may be implemented in a system in which a client, such as a web browser, is coupled to a server to access state and function for a user session. The client specifies an address to content stored on the server and appends a unique identifier to the address. The client requests the content with the address and the appended identifier, which is transmitted in a content request to the server regardless of whether there is cached content associated with the address to the content.

Embodiments of this invention make page navigation for stateful and dynamically changing web pages completely translucent to the user. Such embodiments cause the browser to ask the server for a new page when new information is required regardless of whether the browser is configured to always load content from cache.

BRIEF DESCRIPTION OF THE DRAWINGS

The foregoing and other objects, features and advantages of the invention will be apparent from the following more particular description of embodiments of the invention, as illustrated in the accompanying drawings in which like reference characters refer to the same parts throughout the different views. The drawings are not necessarily to scale, emphasis instead being placed upon illustrating the principles of the invention.

FIG. 1B is a table illustrating bow loading from cache can result in a stateful web page displaying unintended page content.

FIGS. 1C through 1G illustrate various states of a web page displaying a car having selectable exterior and interior colors according to FIG. 1B

FIG. 2B is a table illustrating how unintended page content is avoided regardless of whether caching is enabled according to one embodiment.

FIGS. 2C through 2G illustrate various states of a web page displaying a car having selectable exterior and interior colors according to FIG. 2B FIG. 3 is a diagram illustrating how the display of unintended page content is avoided in response to redirection by a server according to one embodiment.

DETAILED DESCRIPTION

Figure 1A:
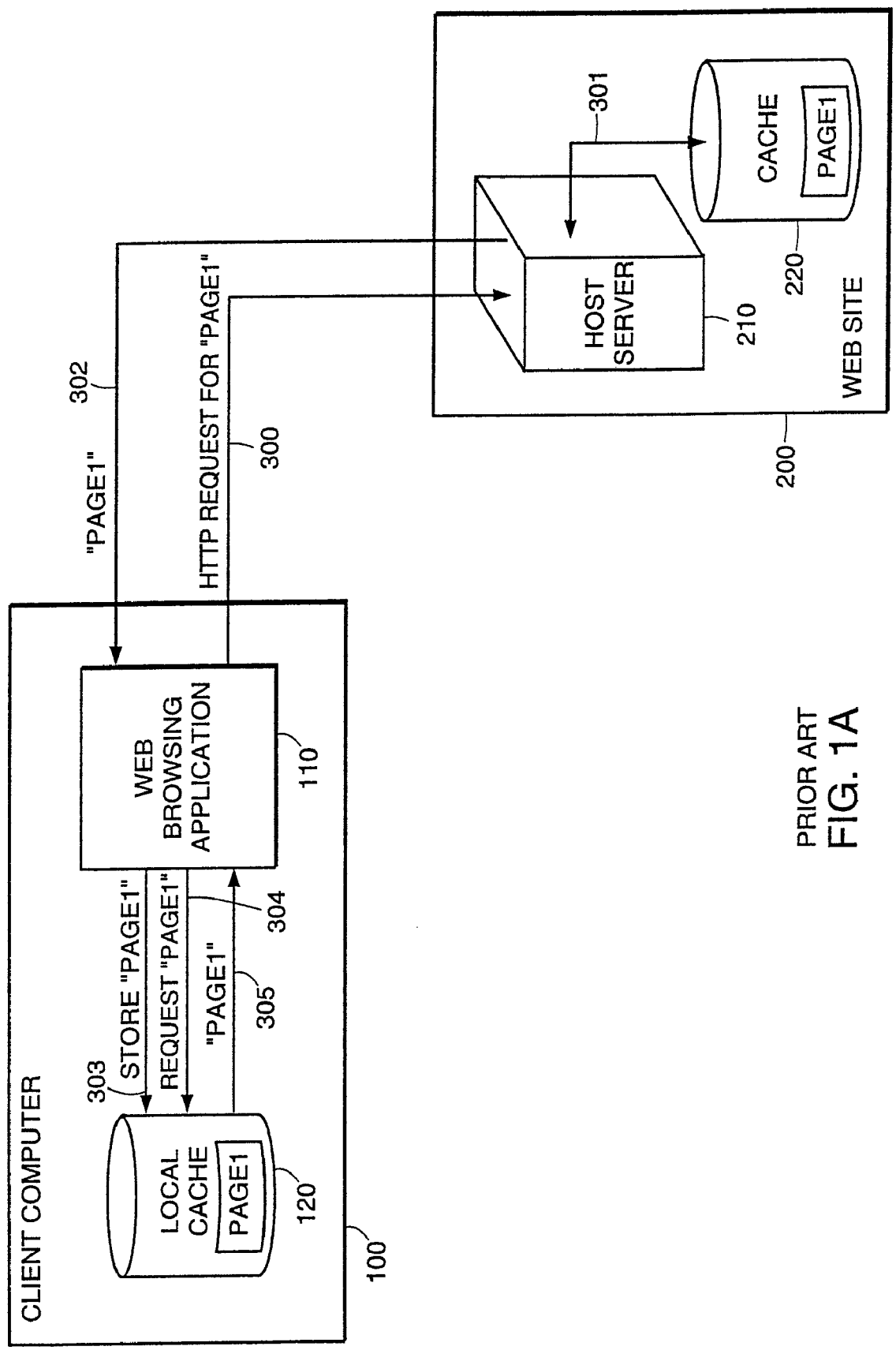
FIG. 1A is a diagram illustrating a typical web browsing system that implements caching.

FIG. 1A is a diagram illustrating a typical web browsing system that implements caching. The system includes a client computer 100 executing a web browsing application 110, which is capable of storing and loading web pages to and from a local cache 120. A web site 200 includes a host server 210 that processes content requests from the browser 110 and responds with the requested script or content files. The host server 210 may have access to a cache 220, such as a database, for storing such files.

Typically, a browser can be configured with different options that specify the frequency for loading page content from a local cache. Typical options include attempting to load from cache (i) every time page content is requested, (ii) never, or (iii) one or more intermediate criteria. When a script or content file of a web page is cached, the cached file is associated with the address specified in the content request. For example, the address may be the URL, and query string if any, used to request and generate the cached script file.

Referring to FIG. 1A, suppose that a user attempts to load a web page that corresponds to a script file on the server 210 having a URL, "http(colon)(slash)(slash)www.mysite.com(slash)
PAGE1.HTML". (1)

Assuming that the web page has not been previously cached, the browser 110 transmits an HTTP request (reference 300) over the network, such as the Internet. The HTTP request is received and processed by the host sender 210, which retrieves the script file, "PAGE1.HTML," from cache memory 220 (reference 301). The script file is then transmitted back to the browser 110 where it is loaded and displayed to the user (reference 302). With caching enabled in the browser 110, the loaded script file is stored in the local cache 120 and associated with URL (1). (reference 303).

Depending on the configuration of the browser 110, subsequent requests for URL (1) may cause PAGEI.HTML to be loaded directly from the local cache 120. For example, the browser 110 may be configured to always load content from the local cache 120 when a requested URL/query string address corresponds to cached content. Thus, with respect to FIG. 1A, the browser 110 will load the script file, PAGE1.HTML, from the local cache 120 whenever URL (1) is requested (references 304 and 305).

If a web page is static (e.g., does not change often), loading page content from a local cache improves browser performance by avoiding additional network and processing delays. However, if a web page is updated often or displays content that depends on the state of the user session, loading page content directly from cache can result in the display of unintended page content.

FIG. 1B is a table illustrating how loading from cache can result in a stateful web page displaying unintended page content. For example, assume a web page displays a car having selectable exterior and interior colors, as illustrated in FIGS. 1C through 1G. In its intended operation, a user selects either an exterior color (i.e., white, red, and black) or an interior color (i.e., grey and black). In response, the browser generates a content request specifying an address that includes the UKL of the web page and a query string indicating the selected interior or exterior color. The web page is stateful, because the resulting page content is dependent on the previous page content. In other words, if an exterior color is selected, the interior color for the resulting page is derived from the interior color of the previous page content. Likewise, if an interior color is selected, the exterior color for the resulting page is derived from the exterior color of the previous page content as well. The state of a web page is typically maintained at the server for a particular user session.

Referring back to FIG. 1B, the table 400 includes three columns specifying, respectively, the address requested (C1), whether page content is loaded from local cache or host server (C2), and a description of the resulting page content (C3). Each row (R1 through R5) corresponds to a new request.

In table cell (R1, C1) the address requested is, http(colon)(slash)(slash)www.mysite.com(slash)
PAGE1.HTML (1).

If no cached content is locally available for this page, an HTTP request specifying the URL (1) is generated and transmitted over the network to the host server 210. The server 210 processes the request and returns the script file, PAGEI.HTML, to the browser 110. As shown in FIG. 1C, the page content resulting from the initial content request is a car 405 having a "black" exterior color and a "grey" interior color, as depicted in the car seat 410. The script file corresponding to this display, PAGE1.HTML, is stored in a local cache 110 where it is available to be loaded when URL (1) is requested again.

In FIG. 1C, the user clicks on an exterior color palette 420 in the display with a pointing device, such as a mouse, to change the exterior color of the car 405 to "red". Referring back to FIG. 1B, the click event triggers an event handler, defined in PAGE1.HTML, generating a new content request to display the car with a "red" exterior. In table cell (R2, C1), the requested address is, http(colon)(slash)(slash)www.mysite.com(slash)
PAGE1.HTML?EXT_COLOR="RED" (2)

Figure 1D:
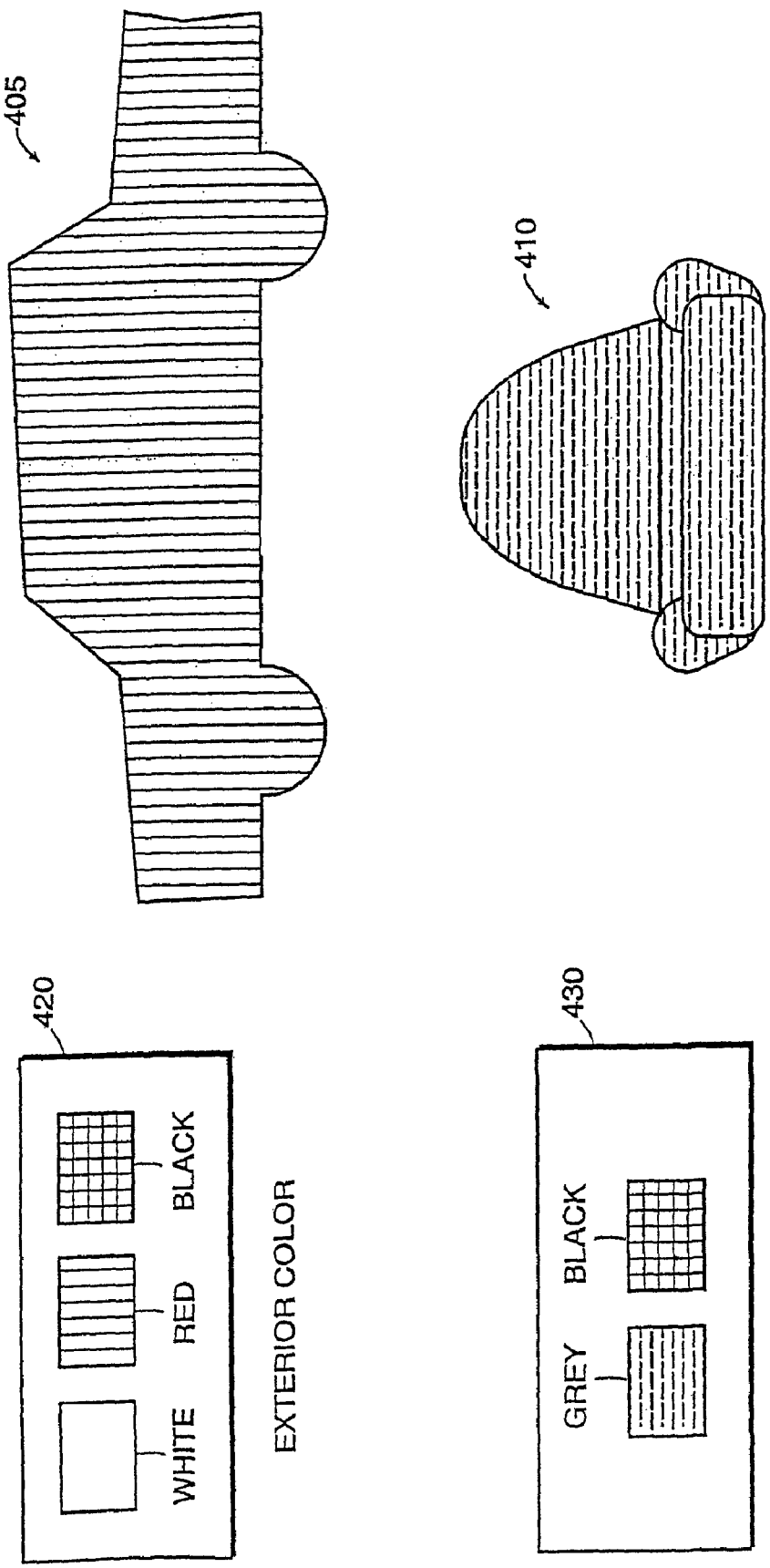

The requested address includes an appended query string parameter specifying the "red" exterior color (i.e., ?EXT_COLOR="RED"). Again, there is no cached content associated with the requested URL/query string address. Thus, an HTTP request is generated and transmitted over the network to the host server 210 specifying the URL/query string (2). The server 210 responds with a modified script file, PAGE1.HTML for displaying the car 405 with "red" exterior and "grey" interior colors, as shown in FIG. 1D. The "grey" interior color is derived from the previous state of the web page (i.e., FIG. 1C) with the state being maintained at the server. The modified script file, PAGEI.HTML, is stored in the local cache where it is available to be loaded when URL/query string (2) is requested again.

In FIG. 1D the user clicks on an interior color palette 430 in the display to change the interior color of the car 405 to "black" Referring back to FIG. 1B, the click event triggers an event handler, defined in PAGEI.HTML, generating a new content request to display the car 405 with a "black" interior. In table cell (R3,C1), the requested address is, http(colon)(slash)(slash)www.mysite.com(slash)
PAGE1.HTML?INT_COLOR="BLACK" (3)

Figure 1E:
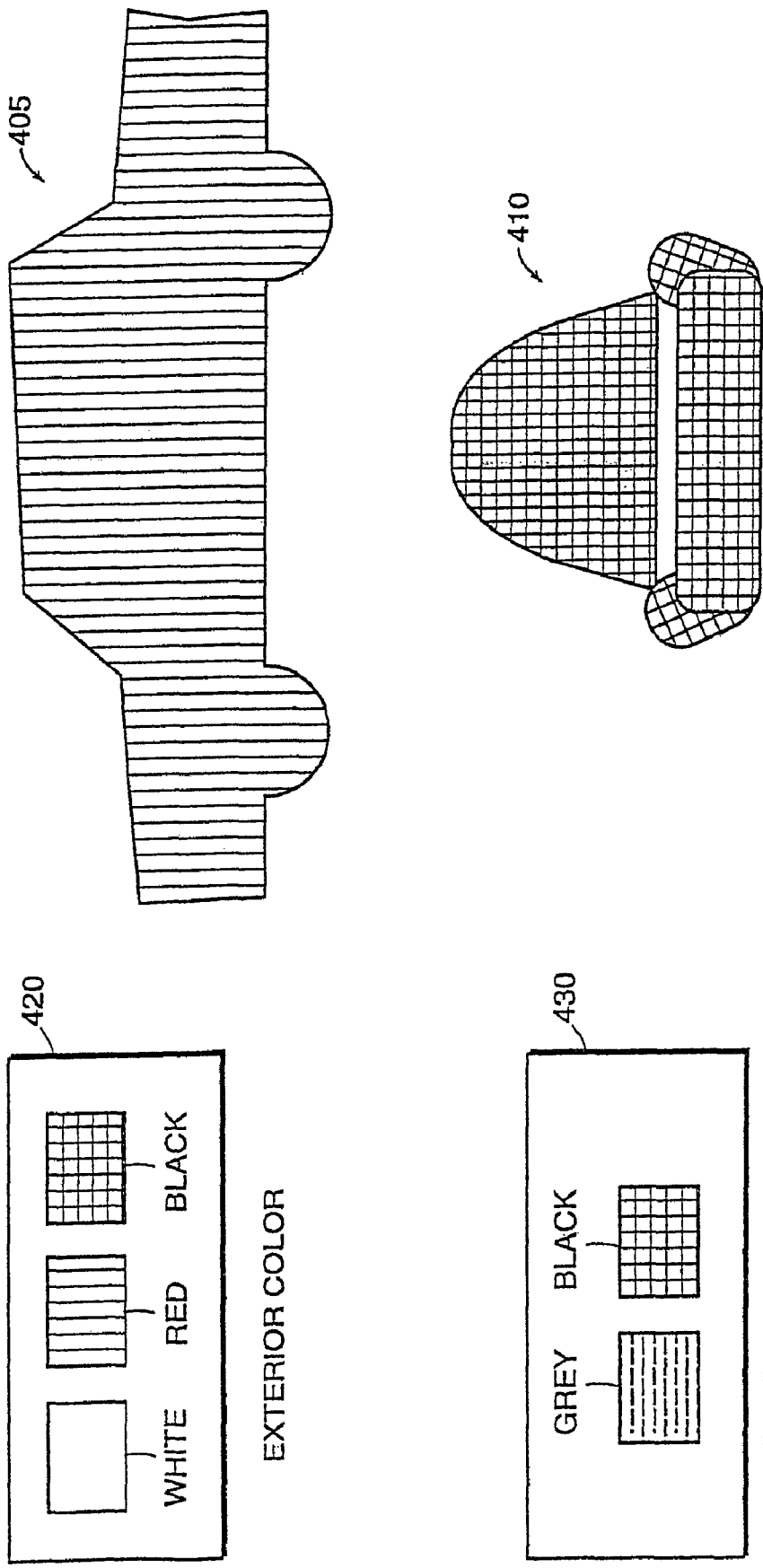

The requested address includes an appended query string parameter specifying the "black" interior color (i.e., ?INT_COLOR="BLACK"). Again, there is no cached content associated with the requested URL/query string address. Thus, an HTTP request is generated and transmitted over the network to the host server 210 specifying the URL/query string (3). The server 210 responds with a modified script file for displaying the car 405 with "red" exterior and "black" interior colors, as shown in FIG. 1E. The "red" exterior color is derived from the previous state of the web page (i.e., FIG. 1D). The modified script file, PAGE1.HTML, is again stored in the local cache 120 where it is available to be loaded when URL/query string (3) is requested again.

Figure 1F:
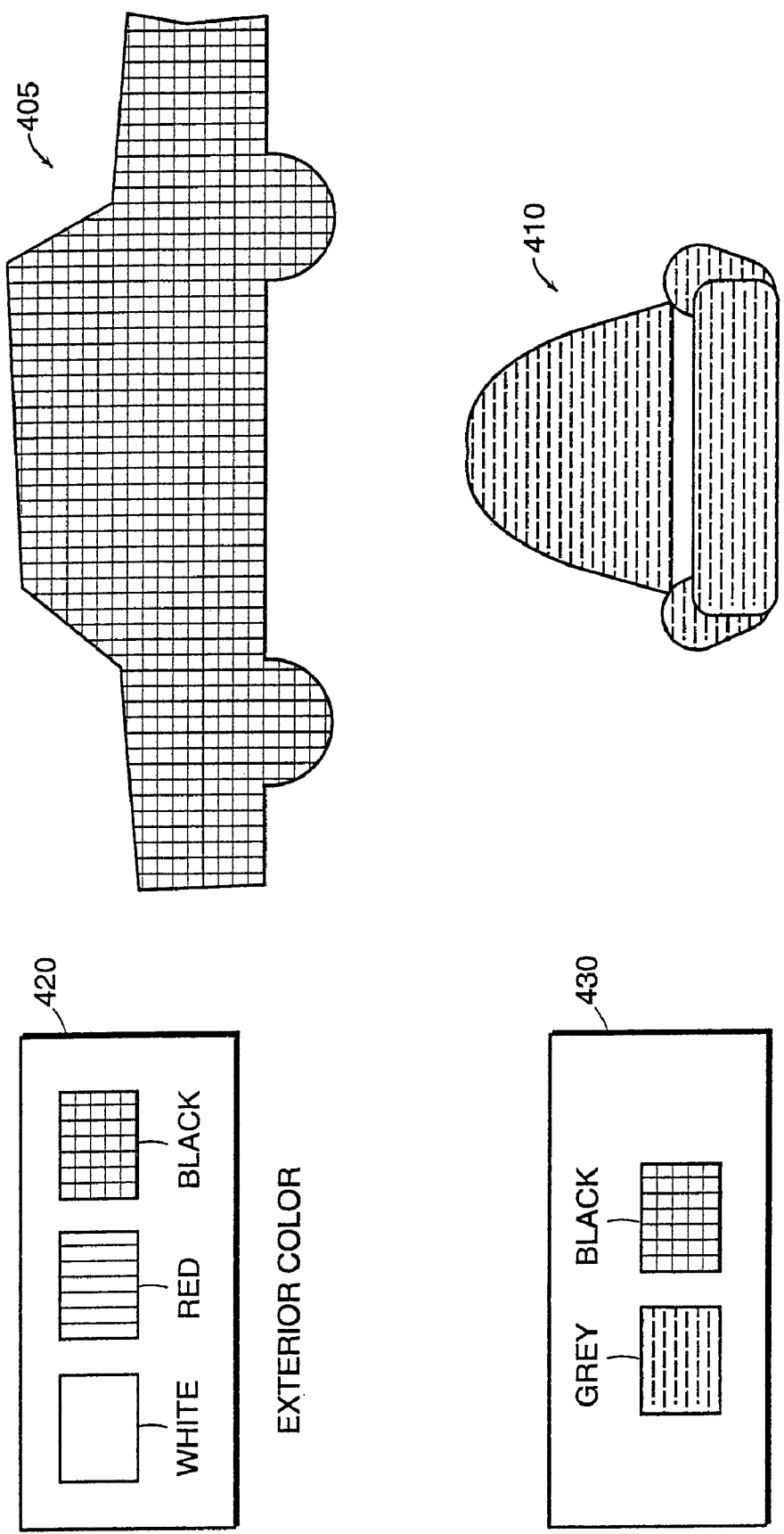

Assume now that the user closes the browser and relaunches a new session at later time. Referring to row R4 of FIG. 1B, if URL (1) is requested again, the browser checks the local cache for cached content corresponding to URL (1). Upon locating the corresponding script file in the cache, PAGE1.HTML is loaded into the browser displaying the expected default car with "black" exterior and "grey" interior colors, as shown in FIG. 1F.

Finally, referring back to row R5 of FIG. 1B, when the user triggers a content request for a car having a "black" interior, the browser will again check the local cache, locate the cached script file, PAGE1.HTML, corresponding to URL/query string (4) and load it into the browser. However, loading the cached script file into the browser causes the unintended display of a car having a "RED" exterior with "black" interior, as shown in FIG. 1G. If the browser transmitted the content request to the host server 210, the page content would have been a car with a "black" interior color and a "black" exterior color, which corresponds to the previous state of the exterior color.

Therefore, if a browser is set to never go back to the server when cached content is available, web pages that contain stateful information may display unintended page content. To address this issue, techniques have been implemented in which a website posts a notice to the browser to turn caching off. However, this is a complicated task with some browsers.

Embodiments of the present invention provide a system and method for displaying dynamic page content in a page-caching browser. The system and method prevent the loading of unintended page content from a local cache into a browser by ensuring the uniqueness of the content request. Such embodiments include (i) specifying an address to stored content; (ii) appending a unique identifier to the address; (iii) requesting the content with the address and appended identifier; and (iv) transmitting the content request to the server regardless of whether there is cached content associated with the address. By appending a unique identifier to the requested address, each content request is unique, thus, preventing the browser from locating and loading corresponding content from the cache.

Figure 2A:
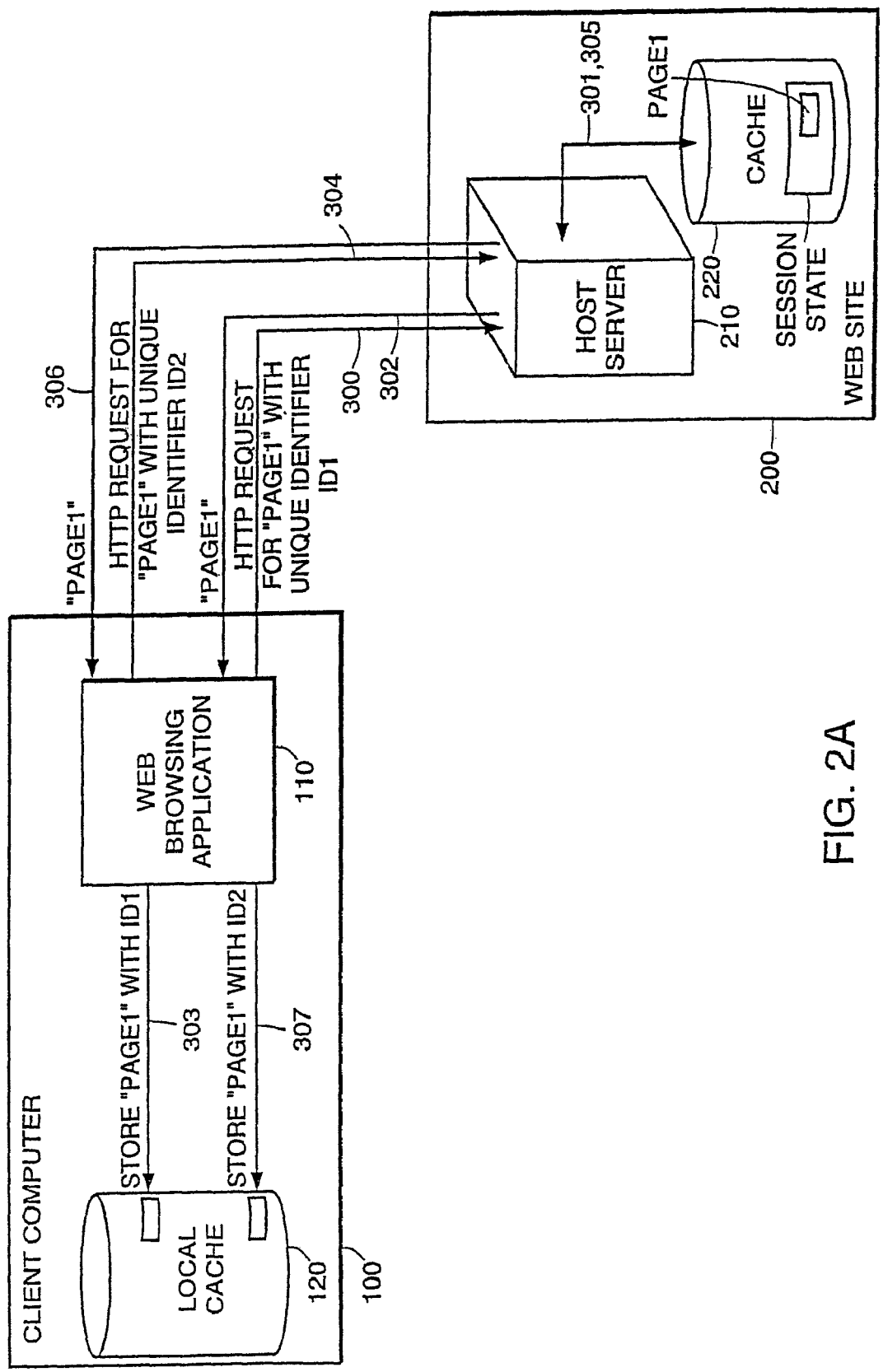
FIG. 2A is a diagram illustrating a web browsing system that requests content from a server regardless of whether caching is enabled according to one embodiment.

FIG. 2A is a diagram illustrating a web browsing system that requests content from a server regardless of whether caching is enabled according to one embodiment. The system includes a client computer 100 executing a web browsing application 110, which is capable of storing and loading web pages to and from a local cache 120. A web site 200 includes a host server 210 that processes content requests, such as HTTP requests, from the browser 110 and responds with the requested script or content files. The host sender 210 may have access to a cache 220, such as a database, for storing such files. The client and server processes discussed herein are not limited to being executed in different locations. They may, in fact, execute on the same processing device.

According to embodiments of the invention, the browser application 110 submits a request for page content specifying the address of a script or content file stored on a server 210 along with a unique identifier appended to the address. According to the embodiment illustrated in FIG. 2A, the web browsing application 110 submits a page request by specifying the URL of a web page along with a unique identifier appended to the URL as a query string parameter (reference 300). For example, in the following URL/query string, http(colon)(slash)(slash)www.mysite.com(slash)
PAGE1.HTML?&ID=0.123127678    (4)

the unique identifier, "&ID=0.123127678," is appended to the URL in a query string.

The unique identifier may be generated in a number of ways known to those skilled in the art. For example, in one embodiment, the unique identifier may be a random number generated by a script function, such as the Math.random( ) method defined in JavaScript. In another embodiment, the unique identifier may be a system time stamp. In a further embodiment, the unique identifier may include any unique alpha-numeric or other symbolic representation.

The host server 210 processes the request to extract the requested script file, PAGE1.HTML, from a cache 220, such as a database (reference 301). In processing the HTTP request, the server 210 may disregard the unique identifier in the query string. The server 210 then transmits the script file to the browser 110, where it is loaded and displayed (reference 302). If caching is enabled, the browser 110 stores the loaded script file in the local cache 120 (reference 303), where it is available to be loaded directly when URL/query string (4) is requested again.

However, because the query string contains a unique identifier, it is highly unlikely that a URL/query string will be generated that is identical to URL/query string (4). Subsequent requests for web page, "PAGE1.HTML," may have the same URL, but the unique identifier specified in the query string will be different. When the browser 110 checks the local cache 120 for cached content corresponding to a unique address/identifier pair, the unique identifier prevents such association. Thus, the browser 110 is forced to transmit the request to the server 210 (reference 304). For example, referring to FIG. 2A, a subsequent request for "PAGE1.HTML" may specify the following URL/query string, www.mysite.com(slash)
PAGE1.HTML?&ID=1001.1287998    (5)

Since URL/query string (5 is not identical to URL/query string (4), the browser 120 automatically transmits the request over the network to the server 210 (reference 304). Therefore, such embodiments avoid the display of unintended page content for dynamic and stateful web pages allowing the server to dictate and maintain the state of the page content.

FIG. 2B is a table illustrating how unintended page content is avoided regardless of whether caching is enabled. Table 500 includes three columns specifying, respectively, the address requested (C1), whether page content is loaded from local cache or host server (C2), and a description of the resulting page content (C3). Each row (R1 through R5) corresponds to a new request. FIGS. 2C through 2G illustrate various states of a web page displaying a car having selectable exterior and interior colors according to FIG. 2B. The web page has the same intended operation as discussed in connection with FIGS. 1C through 1G.

Referring to FIG. 2B, the address requested in table cell (R1, C1) is, http(colon)(slash)(slash)www.mysite.com(slash)
PAGE1.HTML?&ID=123123678    (6).

Figure 2C:
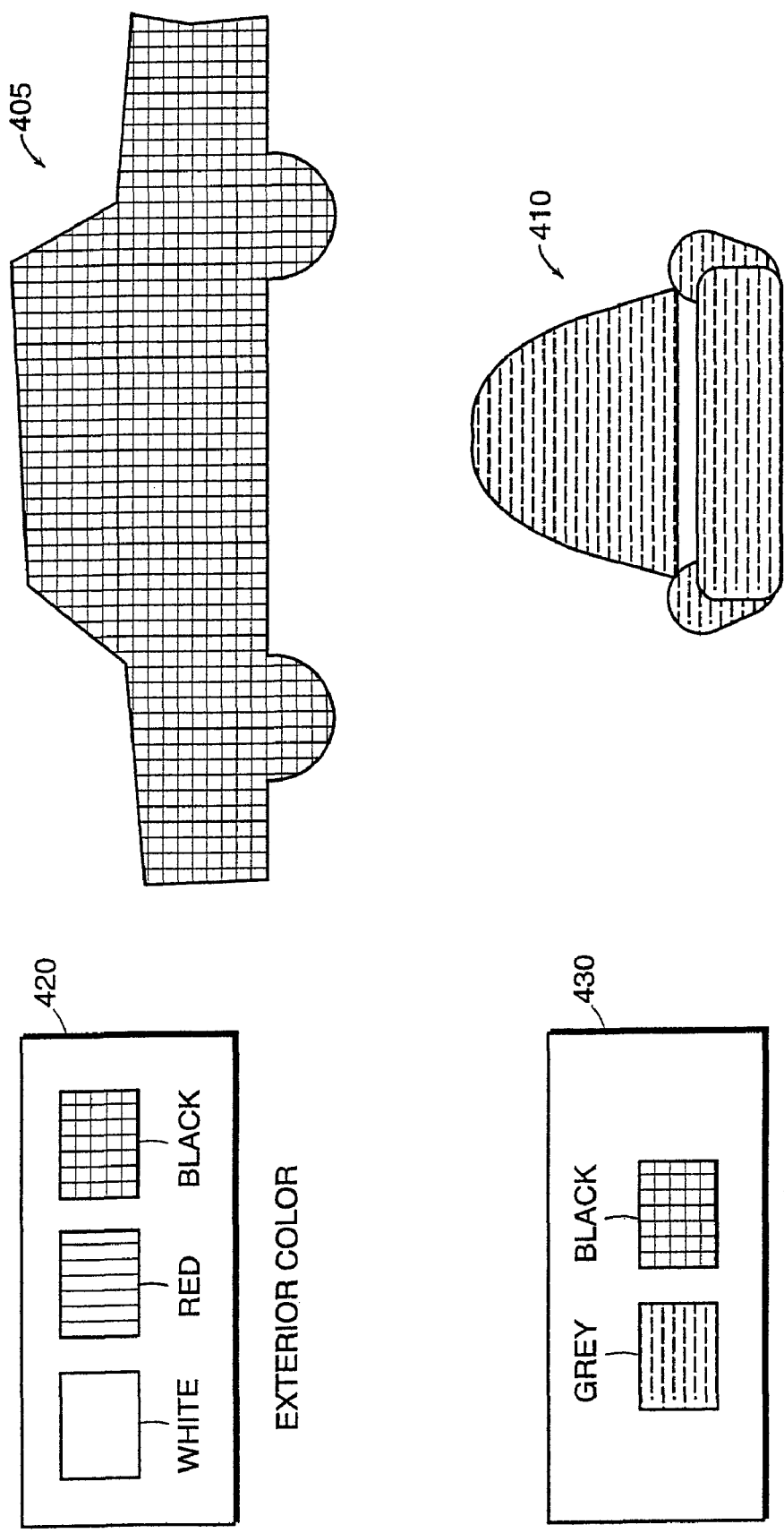

The requested address includes a unique identifier appended to the UKL in the form of a query string (i.e., ?&ID=123123678). Since the identifier is intended to be unique, there is no cached content associated with the UKL/query string (6). Thus, an HTTP request specifying the URL/query string (6) is generated and transmitted over the network to the host server 210. The server 210 processes the request and returns the script file, PAGE1.HTML, to the browser 110. The server 210 may ignore the unique identifier in the query string, since its main function is to uniquely identify the URL/query string address preventing the browser 110 from loading content from cache. As shown in FIG. 2C, the page content resulting from the initial content request is a car 405 having a "black" exterior color and a "grey" interior color, as indicated by the car seat 410. The script file corresponding to this display, PAGE1.HTML, is stored in local cache 110 where it is available to be loaded when URL (6) is requested again. However, since the script file, PAGE1.HTML, is requested with a unique identifier that is different in each request, it is highly unlikely that the browser 110 will load the script file, PAGE1.HTML, from cache again.

In FIG. 2C, the user clicks on an exterior color palette 420 in the display with a pointing device, such as a mouse, to change the exterior color of the car to "red". Referring back to FIG. 2B, the click event triggers an event handler, defined in PAGE1.HTML, that generates a new content request to display the car with a "red" exterior. In table cell (R2,C1), the requested address is, http(colon)(slash)(slash)
www.mysite.com7PAGE1.HTML?EXT_COLOR=
"RED"&ID==19283192873    (7)

Figure 2D:
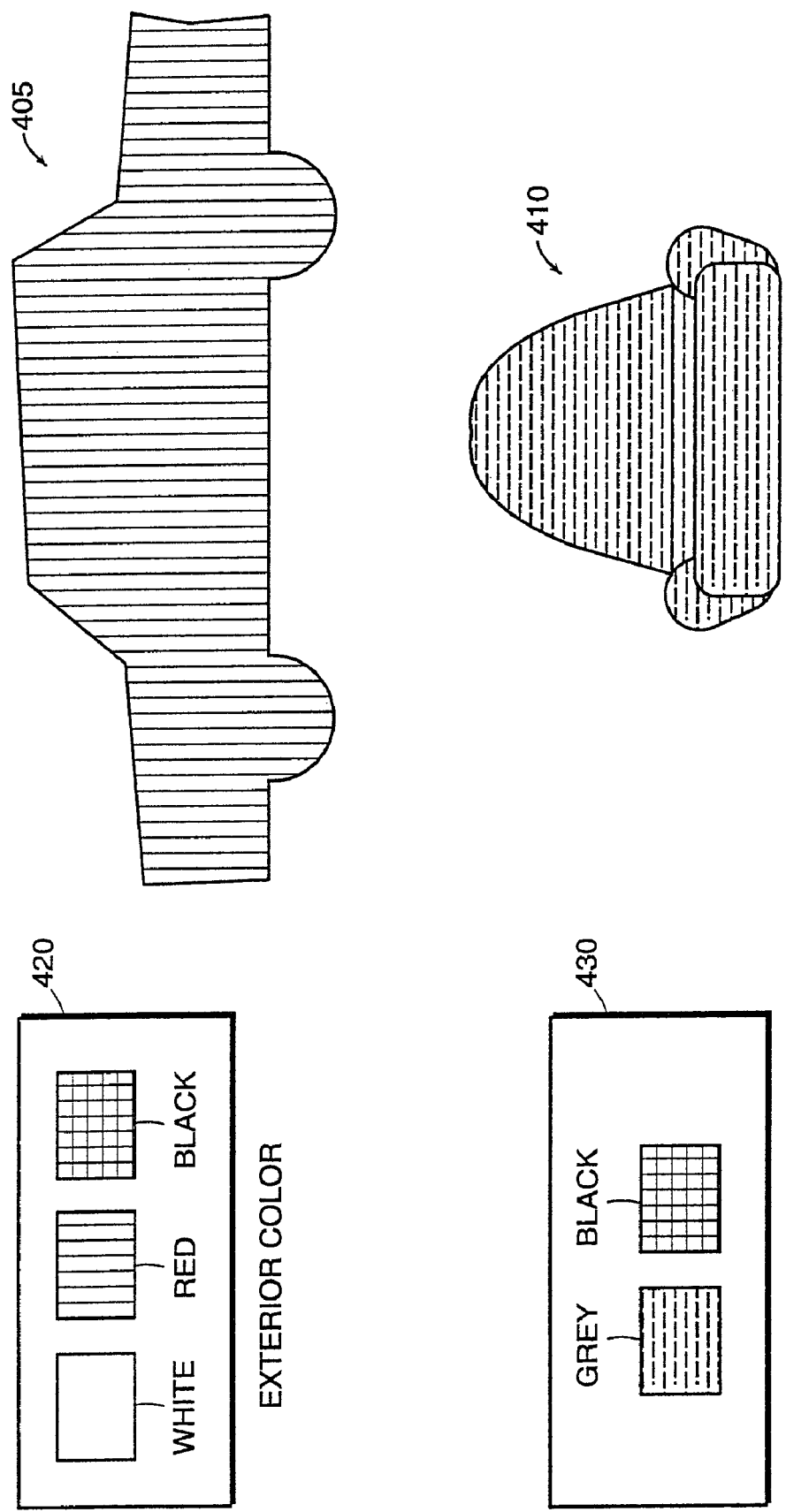

The requested address includes an appended query string parameter specifying the "red" exterior color (i.e. ?EXT_COLOR="ED") as well as a unique identifier (i.e., &ID=19283192873). Again, there is no cached content associated with the requested URL/query string address (7) due to the unique identifier appended to the query string. Thus, an HTTP request is generated and transmitted over the network to the host server 210 specifying the URL/query string (7). The server 210 responds with a modified script file, PAGE-I.HTML for displaying the car 405 with "red" exterior and "grey" interior colors, as shown in FIG. 2D. The "grey" interior color is derived from the previous state of the web page (i.e., FIG. 2C), with the state being maintained at the server. The modified script file, PAGE1.HTML, is stored in the local cache where it is available to be loaded when URL/query string (7) is requested again. However, since the script file, PAGEI.HTML, is requested with a unique identifier that is different in each request, it is highly unlikely that the browser 110 will load the script file, PAGE1.HTML, from cache again.

In FIG. 2D the user clicks on an interior color palette 430 in the display to change the interior color of the car to "black." Referring back to FIG. 2B, the click event triggers an event handler, defined in PAGE1.HTML, generating a new content request to display the car with a "black" interior. In table cell (R3,CI), the requested address is, http(colon)(slash)(slash)www.mysite.com(slash)
PAGE1.HTML?INT_COLOR="BLACK"&ID-
123612    (8)

Figure 2E:
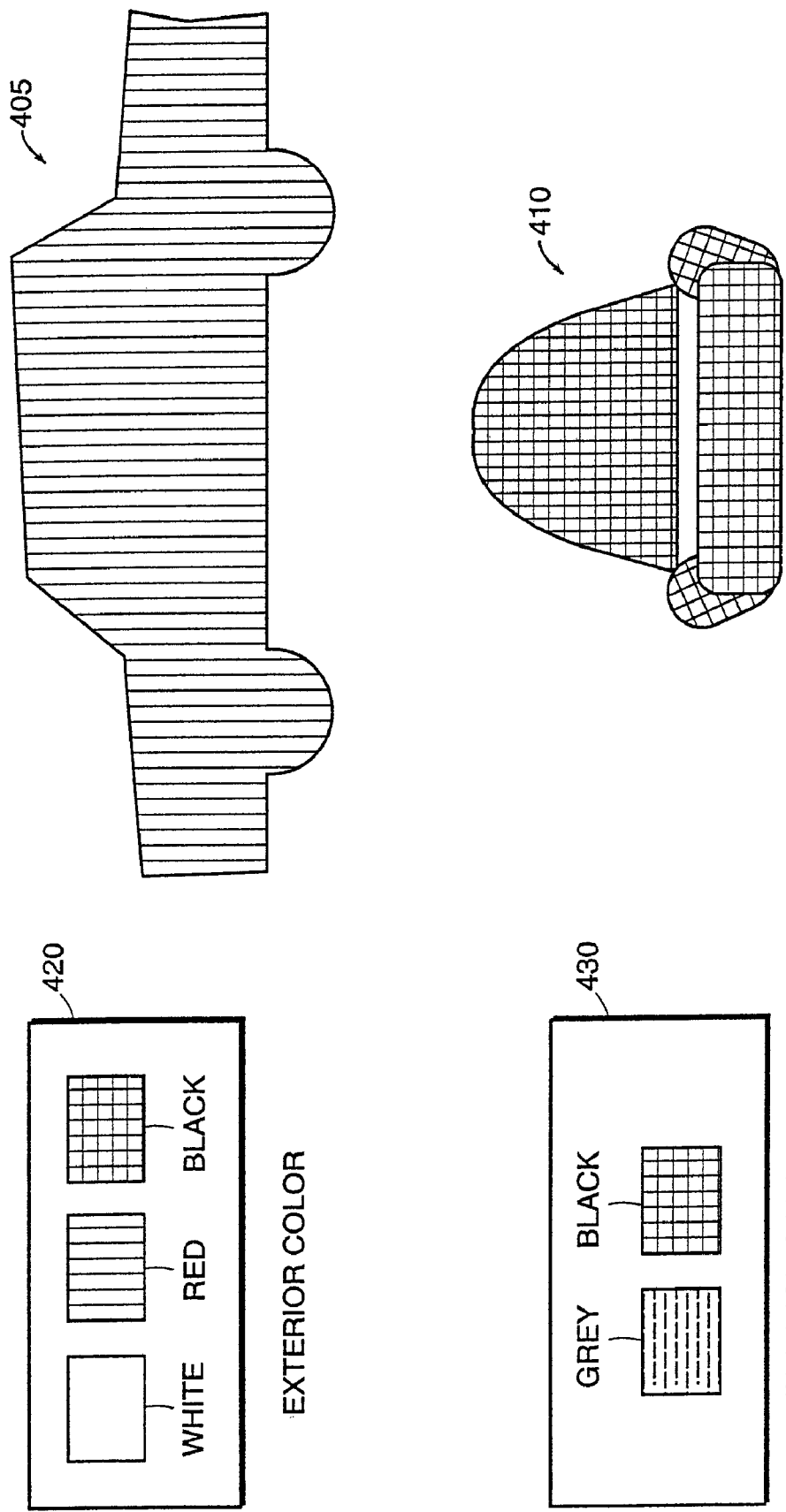

The requested address includes an appended query string parameter specifying the "black" interior color (i.e., ?INT_COLOR="BLACK") as well as a unique identifier (i.e., &ID=123612). Again, there is no cached content associated with the requested URL/query string address (8) due to the unique identifier appended to the query string. Thus, an HTTP request is generated and transmitted over the network to the host server 210 specifying the URL/query string (8). The server 210 responds with a modified script file for displaying the car with "red" exterior and "black" interior colors, as shown in FIG. 2E. The "red" exterior color is derived from the previous state of the web page (i.e., FIG. 2D). The modified script file, PAGE1.HTML, is again stored in the local cache 120 where it is available to be loaded when URL/query string (8) is requested again. However, since the script file, PAGE1.HTML, is requested with a unique identifier that is different in each request, it is highly unlikely that the browser 110 will load the script file, PAGE1.HTML, from cache again.

Referring back to FIG. 2B, assume that the user closes the browser and relaunches a new session at a later time. From the previous user session, the script file, PAGE1.HTML, for the initial content of the web page was cached and associated with the URL/query string (6) that is identified in table cell (R1, C1). However, when the user attempts to load the initial web page, the URL address is the same, but the address is appended with a different unique identifier. For example, in table cell (R4, C1), the requested address is http(colon)(slash)(slash)www.mysite.com(slash)
PAGE1.HTML?&ID=8798456    (9)

Figure 2F:
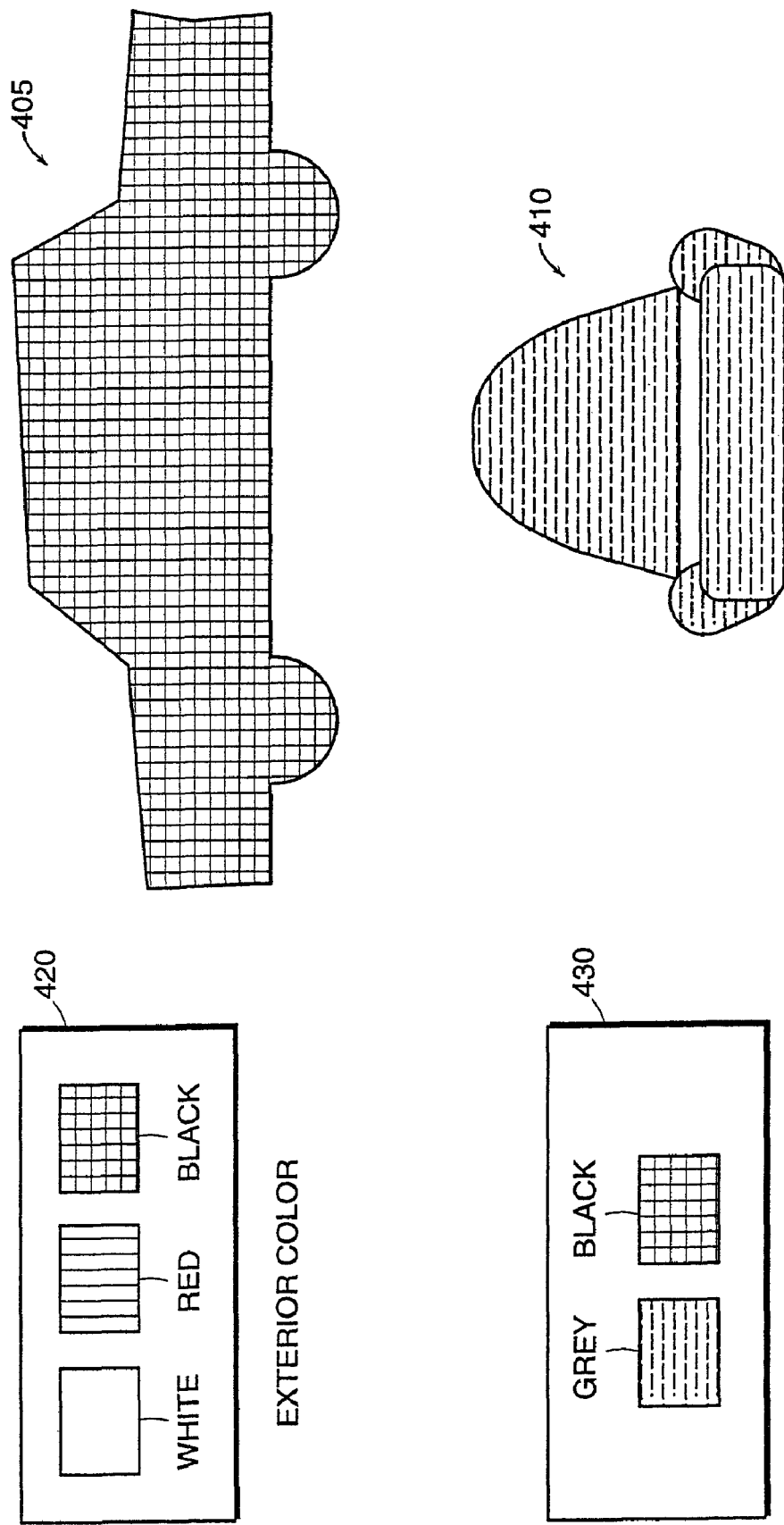

Since the URL/query string address (9) is not identical to URL/query string address (6), an HTTP request is generated and transmitted over the network to the host server 210 specifying the URL/query string (9). The server 210 responds with a modified script file for displaying the default car with "black" exterior and "grey" interior colors, as shown in FIG. 2F. The script file, PAGE1.HTML, is again stored in the local cache 120, where it is available to be loaded when URL/query string (9) is requested again. However, since the script file, PAGE1.HTML, is requested with a unique identifier that is different in each request, it is highly unlikely that the browser 110 will load the script file, PAGE1.HTML, from cache again.

In FIG. 2F, the user clicks on an interior color palette 430 in the display to change the interior color of the car to "black". Referring back to FIG. 2B, the click event triggers an event handler, defined in PAGE1.HTML, generating a new content request to display the car with a "black" interior. In table cell (R5,C1), the requested address is, http(colon)(slash)(slash)www.mysite.com(slash)
PAGE1.HTML?INT_COLOR="BLACK"&ll>=458    (10)

The requested address includes an appended query string parameter specifying the "black" interior color (i.e., ?INT_COLOR="BLACK") as well as a unique identifier (i.e., &ID=458). Again, there is no cached content associated with the requested LTRL/query string address (10) due to the unique identifier appended to the query string. Thus, an HTTP request is generated and transmitted over the network to the host server 210 specifying the URL/query string (10). In contrast to FIGS. 1B and 1G which loaded the page content from the cache, the server 210 responds with a modified script file for displaying the car with "BLACK" exterior and "black" interior colors, as shown in FIG. 2G. By appending the unique identifier to the requested address, the browser 110 is forced to transmit the content request to the server 210, because cached content is not associated with the unique address/identifier pair. Thus, the state of the web page is maintained as intended.

According to an embodiment of the invention, the following segment of JavaScript code replaces a displayed web page with new page content from a web server regardless of whether the browser is configured to always load from the cache first.

```
function getWebSite( )    {
            (parent.document.location.replace(http(colon)(slash)(slash)mysite.com?
            &ID=+Math.random( ));
        }
```

Web browsers, such as Microsoft's Internet Explorer and Netscape's Navigator, also provide capabilities for navigating forwards and backwards among web pages already visited during a browser session. Typically, web browsers implement these capabilities through a navigational toolbar that includes elements, such as "Back" and "Forward" action buttons. By clicking the "Back" or "Forward" button, the browser can request and load a web page previously visited during a browser session. The UKL/query string for a previous web page is retrieved from a temporary history cache, which maintains an ordered list of UKL/query strings used in previous requests for web pages. In the case, where a browser is configured to always attempt to load from cache first, a "Back" or "Forward" navigational event will cause the browser to load page content from cache.

For example, referring to FIG. 2B, assume that a user is currently viewing the car with "black" exterior and "black" interior colors, which resulted from the content request identified in table cell (R5, C1). If the user clicks the "Back" button in the toolbar of the browser, the address identified in table cell (R4, C1), including the same unique identifier is requested again. In this case, there is cached content corresponding to the requested URL/query string. Thus, the browser loads content directly from the cache. This results in the browser displaying a car with "black" exterior and "grey" interior colors, losing the changes made in the previous content request identified in row R4.

In certain web applications, a web designer may want changes in subsequent pages to affect the page content of earlier or later pages. Thus, if the user makes a change to one or more web pages that affect the content or have the ability to affect the content of earlier or later web pages, the browser must transmit the content request to the server rather than load prior page content from cache. In this way, changes made in subsequent pages can be reflected in related pages when a user navigates between pages.

The following JavaScript code segment in a script file, such as PAGE1.HTML, determines whether the current page is being loaded from cache and, if so, causes the browser to reload the page from the server:

```
originalReload = parent.step1_Reload;
if(originalReload != true)
    parent.step1_Reload = true;
else
{
    parent.step1_Reload = false;
    document.location.replace("www.mysite.com(slash)PAGE1.HTML?&ID=" +
    Math-random( ));
{
```

The boolean flag variable, step1_Reload, is maintained in a parent object (e.g, window or frame) of a child object (e.g., window or frame) that contains the script file, PAGE1 .HTML. If the "parent.step1_Reload" flag is set to "false," the script is being loaded from the server and is allowed to continue. Conversely, if the "parent.step1_Reload" flag is set to "true," the script is being loaded from cache and is prevented from completing by submitting a new unique request for page content from the server. As illustrated in the code segment, a unique identifier is appended to the URL/query string, in which the unique identifier is generated by the JavaScript method, Math.random( ).

When the script file is loaded from the server for the first time, the parent.step1_Reload flag is initially set to false. Thus, the script file is allowed to continue loading from the server with the flag being changed to "true." When the page is requested again, such as in response to a navigational "Back" event, the page starts to load from cache, because there is cached content that corresponds to the same UKL/query string, including the same unique identifier. As the browser executes the above code segment, the parent.step1_Reload flag is changed back to "false" and a new request for the script file is submitted with a new unique identifier. The new script file from the server is allowed to load, since the "parent.step1_Reload" flag is now set to "false."

The above described code segment is also triggered in response to another browser event, the "refresh" or "reload" of a page currently under view. In most browsers, there is a "refresh" or "reload" button in the browser toolbar, which is used to update the contents of the page being viewed (e.g., static stock ticker web pages) or to reload a page that failed to load properly (e.g., certain graphics missing in display). When a "refresh" or "reload" is attempted, the browser requests the current URL/query string. When caching is enabled, the browser loads the page content directly from cache.

However, by implementing a code segment, similar to the above described code segment, a "refresh" or "reload" event will trigger a new unique content request to the server every time as described above. This ensures that the most current page content is displayed to the user upon activating the "refresh" or "reload" action button.

FIG. 3 is a diagram illustrating how the display of unintended page content is avoided in response to redirection by a server according to one embodiment. A client computer 100 executing a web browsing application 110, which is capable of storing and loading content from a local cache 120. In this example, the local cache 120 stores a script file for displaying page content of a web page having an address, http(colon)(slash)(slash)www.mysite.com(slash)
        PAGE2.HTML    (11).

Assume that the browser 110 transmits a content request for PAGE1.HTML (reference 300) and the address includes a query string directing the web server to transmit the next page after PAGE1, http(colon)(slash)(slash)www.mysite.com(slash)
        PAGE1.HTML?ACTION=NEXTPAGE&ID=1111    (12)

In response to the request, the web server transmits a message redirecting the browser to PAGE2.HTML on the same server (reference 301). However, in order to prevent the browser from loading PAGE2.HTML from cache. The web server transmits the redirection message specifying the Internet address with a unique identifier, such as http(colon)(slash)(slash)www.nisite.com(slash)
        PAGE2.HTML?&ID=2222    (13)

When the browser checks its local cache for the URL/query string (13), there will be no content associated with the same unique address/identifier pair. Therefore, the browser 110 transmits a new content request (reference 302) to the server 210 requesting content for URL/query string (13). Thus, the browser 110 receives updated or stateful content from the server 210 as intended (reference 303).

Figure 4A:
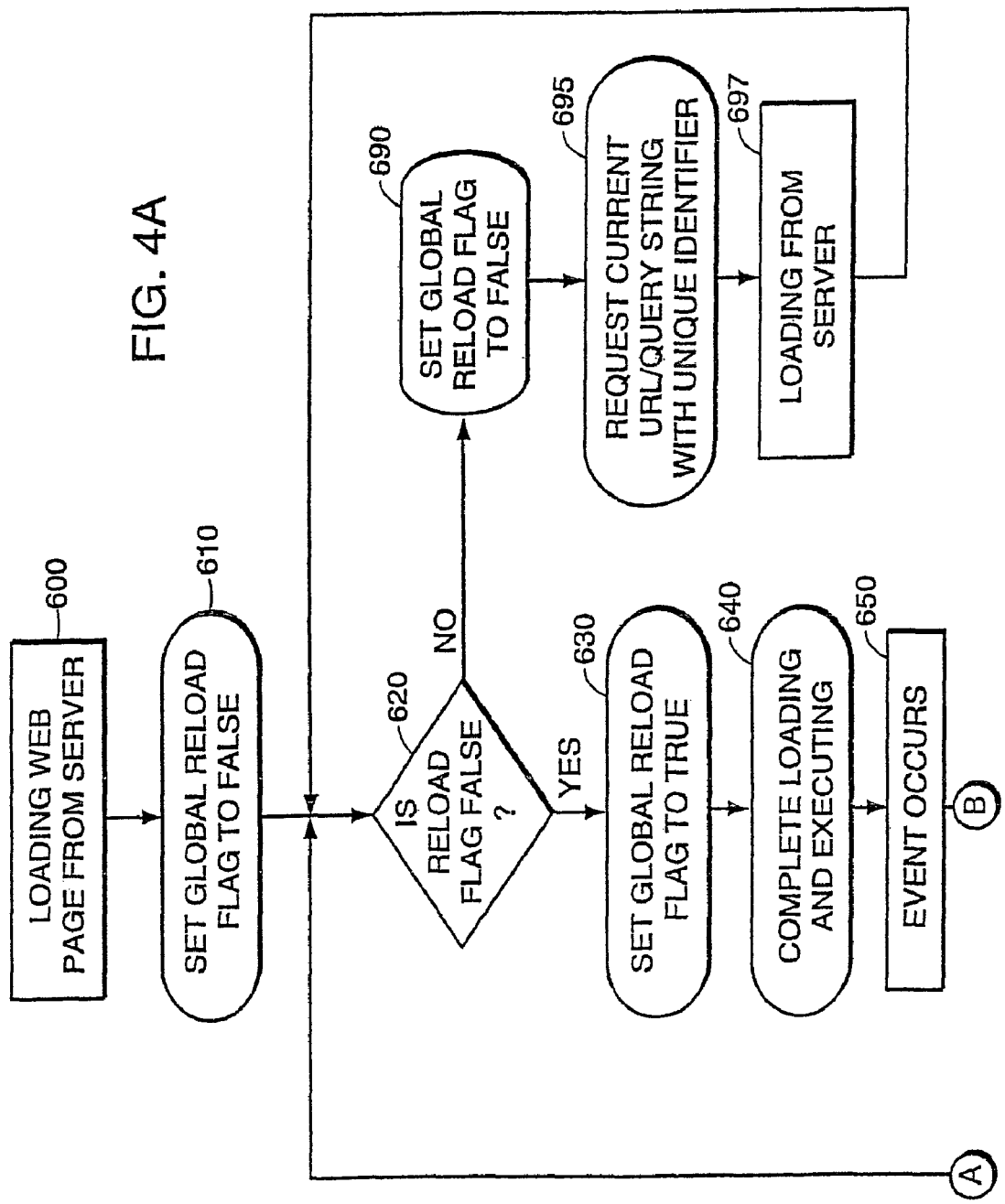
FIG. 4 is a flow diagram illustrating a process for displaying dynamic or stateful page content in a page-caching browser according to one embodiment.
Figure 4:
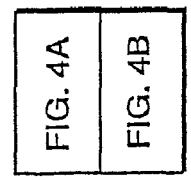

FIG. 4 is a flow diagram illustrating a process for displaying dynamic or stateful page content in a page-caching browser according to one embodiment. This process avoids displaying unintended page content.

At 600, the browser loads in a web page implemented according to an embodiment of the invention.

At 610, while the web page is loading and executing, a global reload flag, such as parent.step1_Reload, is set to false. This flag indicates that the page content is being loaded from the server and is current.

At 620, while the web page is loading and executing, the global reload flag is tested to identify whether the page content is being loaded from cache or from the server. If the reload flag is set to false, then the page is being loaded from the server and the process proceeds to 630. Otherwise, if the reload flag is set to true, the page is being loaded from cache and the process proceeds to 690 to force a reload of the page content from the server.

At 630, since it is determined that the page is being loaded from the server, the page content is current and no reload of the page is required. The global reload flag, however, is set to true to prevent this page from being loaded from cache when requested again.

At 640, the page continues to load and execute.

At 650, an event is triggered. The response to the event depends on the type of event, such as a reload event (660), back/forward/history navigational event (670), or a page event (680).

At 665, if the event is a reload event, the browser requests the address (i.e., URL/query string) of the current web page.

At 667, since the cache maintains content for the requested URL/query string, including the unique identifier, the browser loads and execute the corresponding content from the cache returning to 620.

At 620, the global reload flag is checked to determine whether the content is being loaded from cache. Since the reload flag was set to true at 630, the process proceeds to 690 to request updated page content from the server.

At 690, the global reload flag is set to false indicating that the page is being loaded from the server.

At 695, the browser requests the current URL/query string address with a unique identifier appended to the address for updated page content.

At 697, since there is no cached content corresponding to the address and unique identifier, the page content is loaded from the server.

Again, as the new page content is loaded and executed by the browser in response to the request of 695, the reload flag is checked at 620. Since the reload flag is currently set to false, the process is able to proceed to 630 and 640, to display the updated page content from the server.

Referring back to 660, if the event is not a reload event, then it may be a back/forward/history event (670). If yes, the process proceeds to 675.

At 675, the browser requests the URL/query string, including the same unique identifier, of a previously visited page.

At 677, since the re-requested URL/query string is associated with page content in the cache, the browser initially loads the cached content, but will be forced to request new page content as illustrated in the reload case at 620/690/695/697.

If the event is neither a reload or historical navigation event, the event is typically a user-defined page event (680).

At 683, the global reload, flag is set to false indicating that new page content from the server is being requested.

At 685, the new URL/query string address with a new unique identifier appended is requested.

At 687, since there is no cached content associated with the unique address, the page content is loaded from the server.

At 620, during the loading and executing of the page content, the reload flag is checked. Since the reload flag was set to false in 683, the page content continues to load executing at 630 and 640.

In sum, embodiments of the invention include a system and method for displaying dynamic and stateful page content in a page-caching browser by allowing a browser to load page content from a host server regardless of whether caching is enabled. Therefore, the display of unintended page content is avoided facilitating the use of stateful web pages regardless of whether a browser is configured to always attempt to load content from its local cache. Embodiments of the invention can be implemented even if caching is not enabled. Thus, separate scripts do not need to be maintained for caching systems and non-caching systems.

Those of ordinary skill in the art realize that methods involved in a system and method for displaying dynamic page content in a page-caching browser may be embodied in a computer program product that includes a computer-usable medium. For example, such a computer usable medium can include a readable memory device, such as a hard drive device, a CD-ROM, a DVD-ROM, a computer diskette or solid-state memory components (ROM, RAM), having computer readable program code segments stored thereon. The computer readable medium can also include a communications or transmission medium, such as a bus or a communications link, either optical, wired, or wireless, having program code segments carried thereon as digital or analog data signals.

While this invention has been particularly shown and described with references to preferred embodiments thereof, it will be understood by those skilled in the art that various changes in form and details may be made therein without departing from the scope of the invention encompassed by the appended claims.

What is claimed is:

1. A non-transitory computer-readable medium storing computer-executable instructions that when executed by a processor cause the processor to perform a method that comprises:

receiving a first request for a web page that identifies the web page with a first unique identifier, where the first unique identifier is in addition to an address of the requested web page;

checking the status of a global reload flag to determine whether the web page identified by the first unique identifier is being loaded from a cache memory, where the status of the global reload flag is initially set to false causing the web page to be loaded from a server and not from the cache memory;

setting the global reload flag to true to indicate that a subsequent request for the web page will be loaded from the cache memory; and receiving a second request for the webpage, where if the second request for the web page is a reload request to reload content from the webpage: generating a second request for the web page that identifies the web page with a second unique identifier, different from the first unique identifier and where the second unique identifier is in addition to an address of the requested web page;

searching for the web page in the cache memory based, at least in part, on the global reload flag being set to true;

determining that the web page is not in cache because the second unique identifier being appended to the address of the requested web page causes the address of the web page with the second unique identifier to not be recognized as being located in the cache memory;

setting the global reload flag to false to indicate that the requested web page should be loaded from the server; and forcing the webpage to be loaded from the server;

where if the second request for the web page is a history event to retrieve content from the webpage: generating a second request for the webpage that identifies the webpage with the first unique identifier in addition to the address of the requested web page;

searching for the webpage in cache memory; based at least in part on the global reload flag being set to true;

determining that the webpage is in cache because the address of the requested web page with the first unique identifier has been downloaded previously; and forcing the web page to be loaded from the cache memory.

2. The computer-readable medium of claim 1, where at least one of the first unique identifier and the second unique identifier is generated by a script file.

3. The computer-readable medium of claim 1, where at least one of the first unique identifier and the second unique identifier is one of a random number, a time stamp, an alpha-numeric, or symbolic representation.

4. The computer-readable medium of claim 1, where the second request specifies the URL of the identified web page prepended to the second unique identifier, where the second unique identifier is a query string parameter.

5. The computer readable medium of claim 1, where the second request is generated even if the identified web page has been loaded from the cache memory.

6. A method, comprising:

receiving a first request for a web page that identifies the web page with a first unique identifier, where the first unique identifier is in addition to an address of the requested web page;

checking the status of a global reload flag to determine whether the web page identified by the first unique identifier is being loaded from a cache memory, where the status of the global reload flag is initially set to false causing the web page to be loaded from a server and not from the cache memory;

setting the global reload flag to true to indicate that a subsequent request for the web page will be loaded from the cache memory; and receiving a second request for the webpage, where if the second request for the web page is a reload request to reload content from the webpage: generating a second request for the web page that identifies the web page with a second unique identifier, different from the first unique identifier and where the second unique identifier is in addition to an address of the requested web page;

searching for the web page in the cache memory based, at least in part, on the global reload flag being set to true;

determining that the web page is not in cache because the second unique identifier being appended to the address of the requested web page causes the address of the web page with the second unique identifier to not be recognized as being located in the cache memory;

setting the global reload flag to false to indicate that the requested web page should be loaded from the server; and forcing the webpage to be loaded from the server;

where if the second request for the web page is a history event to retrieve content from the webpage: generating a second request for the webpage that identifies the webpage with the first unique identifier in addition to the address of the requested web page;

searching for the webpage in cache memory; based at least in part on the global reload flag being set to true;

determining that the webpage is in cache because the address of the requested web page with the first unique identifier has been downloaded previously; and forcing the web page to be loaded from the cache memory.

7. The method of claim 6, where at least one of the first unique identifier and the second unique identifier is generated by a script file.

8. The method of claim 6, where at least one of the first unique identifier and the second unique identifier is one of a random number, a time stamp, an alpha-numeric, or symbolic representation.

9. The method of claim 6, where the second request specifies the URL of the identified web page prepended to the second unique identifier, where the second unique identifier is a query string parameter.

10. The method of claim 6, where the second request is generated even if the identified web page has been loaded from the cache memory.

* * * * *